US010197322B2

(12) United States Patent
Lagasse

(10) Patent No.: US 10,197,322 B2
(45) Date of Patent: Feb. 5, 2019

(54) FRIDGECHEST—REFRIGERATOR-STYLE ICE CHEST/COOLER

(71) Applicant: David C. Lagasse, Austin, TX (US)

(72) Inventor: David C. Lagasse, Austin, TX (US)

(73) Assignee: David C. Lagasse, Austin, TX (US)

( * ) Notice: Subject to any disclaimer, the term of this patent is extended or adjusted under 35 U.S.C. 154(b) by 219 days.

(21) Appl. No.: 15/530,732

(22) Filed: Feb. 22, 2017

(65) Prior Publication Data

US 2018/0238607 A1 Aug. 23, 2018

(51) Int. Cl.
*F25D 3/06* (2006.01)

(52) U.S. Cl.
CPC ............. *F25D 3/06* (2013.01); *Y02A 40/968* (2018.01)

(58) Field of Classification Search
CPC ... F25D 3/06; F25D 3/08; F25D 21/14; F25D 23/069; B65D 25/04; B65D 25/10; B65D 81/26; B65D 81/38; B65D 81/3823; A45C 11/20; A23L 3/36
USPC .......................................................... 62/441
See application file for complete search history.

(56) References Cited

U.S. PATENT DOCUMENTS

| 348,036 | A | * | 8/1886 | Mottinger | ............. | F25D 23/066 |
| | | | | | | 217/131 |
| 601,798 | A | * | 4/1898 | Slomka | ............................ | 62/371 |
| 687,718 | A | * | 12/1901 | Bowen | .................. | F25D 17/065 |
| | | | | | | 62/441 |
| 3,395,550 | A | * | 8/1968 | Dungan | ..................... | F25D 3/08 |
| | | | | | | 62/400 |
| 3,591,194 | A | * | 7/1971 | Vega | ......................... | F25D 3/06 |
| | | | | | | 220/259.2 |
| 4,424,687 | A | * | 1/1984 | Morgan | ..................... | F25D 3/08 |
| | | | | | | 62/457.1 |
| 4,515,421 | A | * | 5/1985 | Steffes | .................... | A45C 11/20 |
| | | | | | | 312/351 |
| 5,864,981 | A | * | 2/1999 | Zeman | ................... | A01K 97/22 |
| | | | | | | 206/315.11 |
| 6,039,202 | A | * | 3/2000 | Olstad | .................... | A45C 11/20 |
| | | | | | | 220/23.88 |
| 6,666,045 | B1 | * | 12/2003 | Song | ..................... | F25D 23/003 |
| | | | | | | 62/441 |
| 6,763,678 | B2 | * | 7/2004 | Harper | ..................... | F25D 3/08 |
| | | | | | | 62/461 |
| 6,895,778 | B1 | * | 5/2005 | Ackerman | ................ | F25D 3/06 |
| | | | | | | 62/457.7 |
| 7,284,393 | B1 | * | 10/2007 | Macmillan | ................ | B62B 1/22 |
| | | | | | | 62/331 |

(Continued)

FOREIGN PATENT DOCUMENTS

WO    WO-9717582 A1 *  5/1997  ............. A45C 11/20

*Primary Examiner* — Joshua E Rodden

(57) ABSTRACT

An ice chest/cooler with a hinged wall door that opens to a multi drawer compartment for food and beverage storage. The other compartment of the ice chest-cooler is for ice storage and is accessed through one of two top lids. A mesh divider wall separates the two compartments and allows the ice to chill the drawer compartment. The drawer system provides organization and helps prevent cross contamination between foods and beverages and with the ice. Ice melt should accrue at a slow rate, with the separated compartments reducing open exposure of the ice while using the front wall door for access to food and beverages. And when the ice lid is opened for access to the ice only, the drawer compartment's open exposure is reduced.

5 Claims, 2 Drawing Sheets

(56) References Cited

U.S. PATENT DOCUMENTS

| | | | | |
|---|---|---|---|---|
| 8,065,889 | B1* | 11/2011 | Silberman | F25D 3/08 |
| | | | | 62/457.7 |
| 9,909,797 | B2* | 3/2018 | Van Wuffen | F25D 3/06 |
| 10,099,816 | B2* | 10/2018 | Summers | F25D 3/06 |
| 2003/0173361 | A1* | 9/2003 | Lee | B65D 21/0233 |
| | | | | 220/23.88 |
| 2007/0186579 | A1* | 8/2007 | Barker | F25D 3/08 |
| | | | | 62/407 |
| 2011/0030415 | A1* | 2/2011 | Breyburg | F25D 25/00 |
| | | | | 62/441 |
| 2014/0077467 | A1* | 3/2014 | Galante | B62B 1/12 |
| | | | | 280/35 |
| 2017/0023289 | A1* | 1/2017 | Anderson | F25D 3/08 |
| 2017/0314845 | A1* | 11/2017 | Tang | F25D 3/08 |
| 2018/0238607 | A1* | 8/2018 | Lagasse | F25D 3/06 |
| 2018/0274837 | A1* | 9/2018 | Christensen | F25D 3/06 |

* cited by examiner

FRIDGECHEST—REFRIGERATOR-STYLE ICE CHEST/COOLER

BACKGROUND OF THE INVENTION

Existing conventional ice chest/coolers are a continuous insulated body with the access point being the lid(s) on top. This can cause difficulties when different products are stored in said ice chest. Difficulties include potential cold hands from searching through ice for a beverage, and more so, for a particular beverage. Food product, even when stored in containers, are disturbed through transportation and from sifting for beverages or other. Some containers become crushed or open and expose contents to mix with ice. If raw meat is stored in ice chest/cooler, it can discharge contaminated liquid onto ice and other items in ice chest. The ice itself is often deemed not suitable or preferred for use as drinking ice for a beverage.

Worst case is that the ice and other contents become contaminated with *salmonella* poisoning from raw meat stored in ice chest. Most raw meat packages tend to not be packaged in leakproof packages. Even when the package is additionally stored inside of a typical non-leakproof plastic supermarket bag, both have a tendency to mix with liquids in the ice chest, allowing the raw meat liquid to escape the packaging and typical supermarket bag. Once that liquid leaks out, it can easily contaminate all contents, including foods, beverage cans and bottles, as well as the ice.

Food is best stored away from ice and water, as long as refrigeration temperatures are maintained. It also helps tremendously in avoiding cross contamination and possible *salmonella* poisoning.

SUMMARY OF THE INVENTION

The object of the invention of this ice chest/cooler with door, is to provide a solution to the problems associated with existing conventional ice chests/coolers. When separating food and beverage from ice, the key is having a means for the ice to be able to chill the food and beverages to refrigerator temperatures. The wall door allows easy 'paddle latch' access to a chilled drawer compartment. The drawer system provides storage organization and separation in pull out, leakproof drawers and helps prevent cross contamination between foods and beverages and with the ice and possible *salmonella* poisoning when the potential exists. The other compartment is dedicated to ice storage and the two compartments are separated by a porous mesh divider wall. Because of the mesh divider and the air space between the drawers, chilled air is able to circulate and chill the drawer compartment to refrigerator temperatures. This is only accomplished with chilled air having direct access to the food. Even a drawer within an enclosed space in a cooler will not chill sufficiently because of no direct contact with the chilled air.

Ice is only in contact with itself which maintains clean ice for use with beverages in cups. Ice melt should accrue at a slow rate, with the separated compartments reducing open exposure of the ice while using the wall door for access to food and beverages. And when the ice lid is opened for access to the ice only, the drawer side's open exposure is reduced.

Ice melt that does occur is accumulated in a substantial reservoir at the bottom of the ice chest/cooler and when it is present, it contributes to the chilling of the drawer compartment air. It is also expected that melted ice would not come in contact with any stored product, and render it potable water, an additional benefit if desired. Alternate versions could consist of an upright version with ice storage above or below the drawer compartment. Other alternate versions could consist of direct access to individual drawers in the wall of the ice chest without the need of a wall door.

BRIEF DESCRIPTION OF DRAWINGS

The drawings embody the ideas, characteristics and unique functions of the ice chest/cooler with door. A prototype was also developed for proof of concept. However, the application, as defined by the drawings, description and all appended claims, should be understood to not limit the invention to the particulars of the embodiment submitted. The intention is to cover modifications, equivalents and alternatives falling within spirit and scope of the present application.

To further illustrate and clarify the embodiments of this application, drawings will be referenced for better understanding of mode of use, objectives and advantages.

Drawings will be referenced with the prefix FIG.

Figure 1:
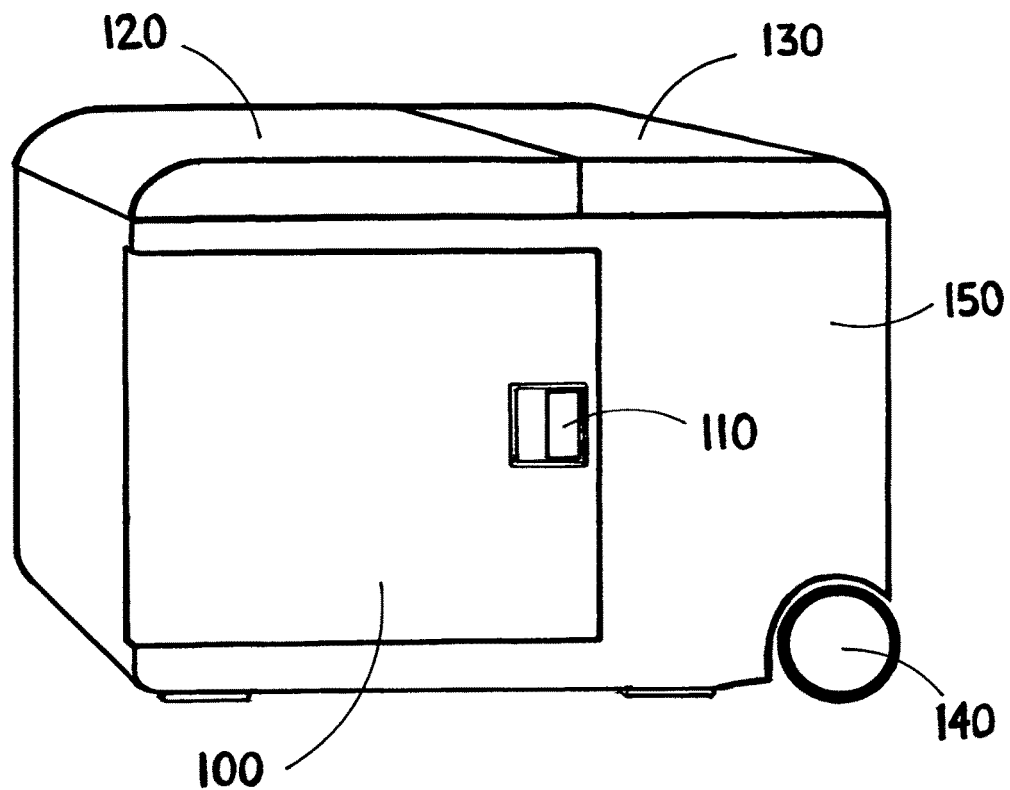
Figure 2:
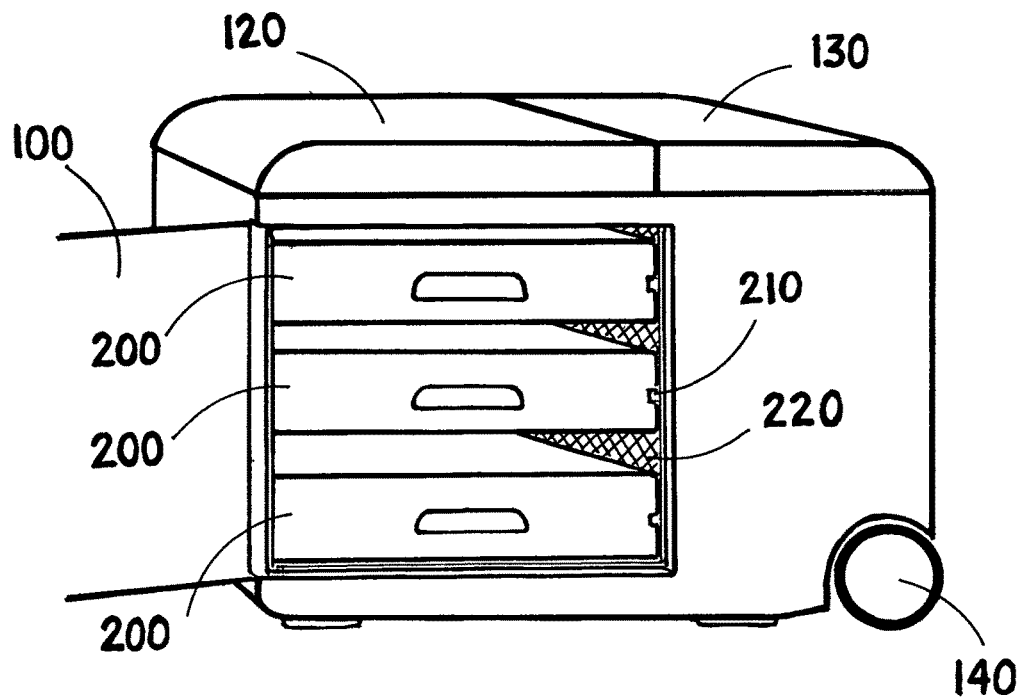
Figure 3:
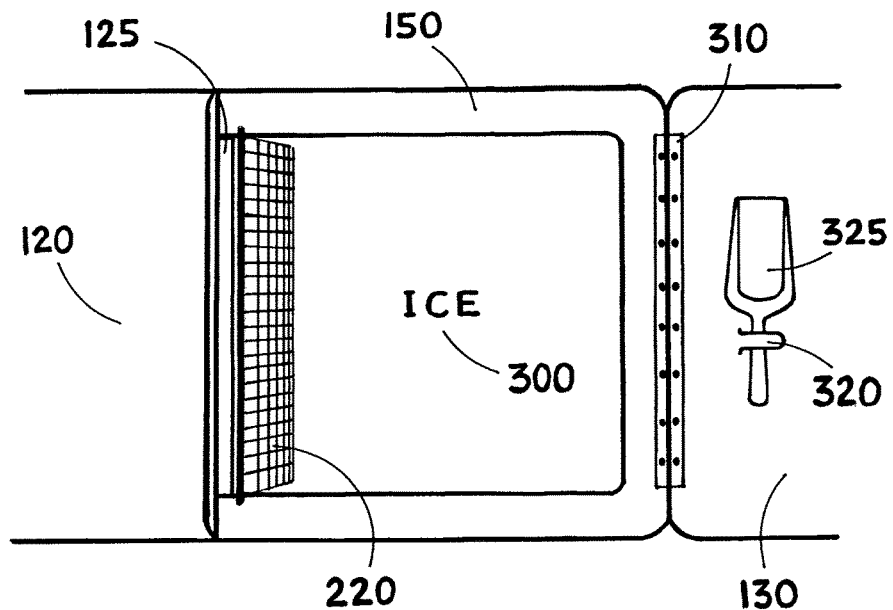
Figure 4:
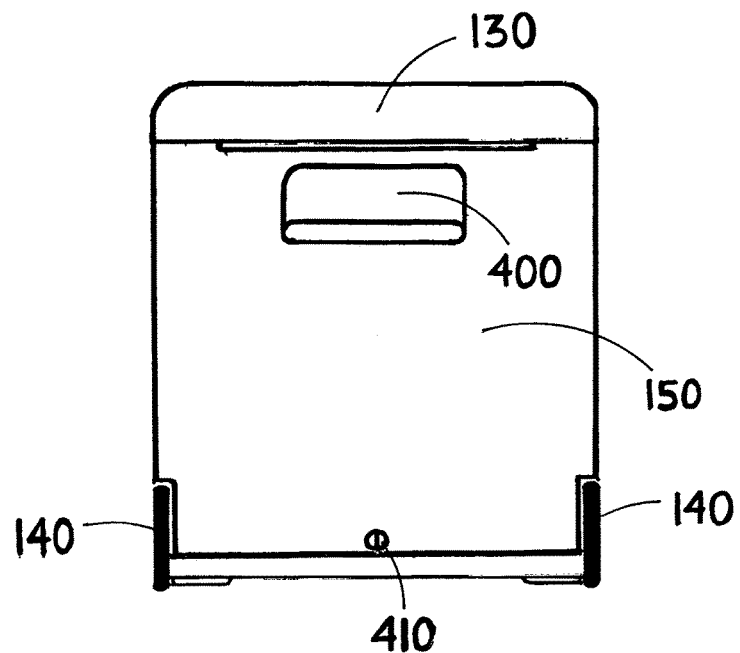

FIG. 1 depicts a front view of the ice chest-cooler with door;

FIG. 2 depicts a front view of the ice chest-cooler with door, with the wall door open and exposing the drawer system;

FIG. 3 depicts a top view of the ice compartment with the ice compartment lid open;

FIG. 4 depicts a view of the rear end of the ice chest with a hand grip.

DETAILED DESCRIPTION OF THE INVENTION

This ice chest-cooler with door will separate food, beverages and ice and will chill the food and beverages to refrigerator-like temperatures because of the open air transfer design. Cross contamination of foods is greatly reduced. This present invention will operate much like a small mobile refrigerator, with a fridge side accessed by a door and an ice side, accessed through a top lid. It is to provide a solution for organization and ease of use in an ice chest/cooler.

FIG. 1 depicts a front view of the ice chest-cooler with door, showing the overall body 150. Front wall door 100 is shown as well as the paddle latch 110 for easy opening and snap close. The dual lids 120 and 130 are depicted. The 120 drawer compartment lid is intended to stay closed in normal use. The 130 lid is for the ice compartment. The wheels 140 provide ease of mobility.

FIG. 2 depicts the front door 100 open and exposing the drawer system inside the compartment. The drawers 200 are leakproof plastic, similar to refrigerator drawers, helping provide easy and quick identification of contents. The drawers operate on a tongue and groove glide system 210, providing easy use. The drawer compartment is separated from the ice compartment by a porous mesh dividing wall 220, which allows the ice to chill the drawer compartment. Air space between the drawers 200, allow the chilled air to circulate around and within the drawers, providing temperatures similar to a refrigerator. The drawers 200, not only reduce cross contamination between foods, beverages and the ice, but also reduce the risk of *salmonella* poisoning when raw meats are stored.

FIG. 3 depicts a top view of the ice compartment 300, with the ice lid 130 open. The drawer compartment lid 120 is closed and shows it's lower lip 125, which won't allow it to open while the ice lid 130 is closed. Which should deter use of the drawer compartment lid 120, providing better insulation to internal chilled air. The porous mesh dividing wall 220 is depicted inside the ice cavity. The 310 piano hinge depicts the hinges used for both lids and the front wall door. The 130 ice compartment lid has a holder built in 320, to house an ice scoop 325, which is a separate accessory that will be provided.

FIG. 4 depicts a view of the rear of the ice chest/cooler 150. Also depicted is a hand grip 400 and the dial style, threaded drain plug 410. The rear wheels 140 are also depicted.

Alternate versions could consist of an upright version with ice storage above or below the door/drawer compartment. Other alternate versions could consist of direct access to individual drawers in the wall of the ice chest without the need of a wall door.

The particular embodiments of this 'ice chest/cooler with door' invention may be modified that one of ordinary skill would deem appropriate and be within the scope and spirit of the application. In that consideration, protection is sought herein as set forth in the description.

The invention claimed is:

1. A portable insulated ice chest-cooler comprising:
    a body, the body having an outer shell and inner shell with an insulation layer between the shells, and having four walls and a floor and open top with a pair of hinged top lids attached to the body that cover the open top;
    an opening on a front wall of the body with a horizontally moving, hinged and latched wall door, and the wall door provides access to a drawer cavity containing drawers for food, beverage or other storage, and the drawer cavity is separated from an ice cavity by a porous mesh dividing wall, which allows chilled air to transfer throughout the drawer cavity from the ice cavity, each respective one of the top lids covering a respective one of the drawer cavity and the ice cavity;
    and the drawers are leakproof and operate on a glide system with airspace between adjacent respective ones of the drawers for air temperature transfer, the glide system being in the form of a tongue and groove system on each of a first side and a second of each respective drawer, with the first side of each drawer being connected to one of the four walls of the body, and the second side of each drawer being connected to the porous mesh dividing wall.

2. The portable insulated ice chest-cooler of claim 1, further comprising: an ice scoop holder removably connected to an underside of the respective top lid that covers the ice cavity, and wherein the mesh dividing wall prevents cross contamination of the contents of the drawer cavity with the ice cavity, and wherein as ice melts in the ice cavity, water accumulates in a reservoir at a bottom of the ice chest-cooler and is in contact only with itself, rendering it potable water.

3. The portable insulated ice chest-cooler of claim 1, further comprising: the porous mesh divider wall is of a pattern to retain ice within the ice cavity yet allows a fluid connection with the drawer cavity, thereby chilling the air in the drawer cavity to reach refrigerator temperatures.

4. The portable insulated ice chest-cooler of claim 1, further comprising: a hand grip attached to the body.

5. The portable insulated ice chest-cooler of claim 1, further comprising: a plug located adjacent a bottom of the body.

* * * * *